(12) United States Patent
Balk et al.

(10) Patent No.: US 8,985,954 B2
(45) Date of Patent: Mar. 24, 2015

(54) DEVICE FOR CONTROLLING THE PITCH OF FAN BLADES OF A TURBOPROP

(75) Inventors: Wouter Balk, Melun (FR); Gilles Alain Charier, La Grande Paroisse (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 787 days.

(21) Appl. No.: 13/322,523

(22) PCT Filed: Apr. 19, 2010

(86) PCT No.: PCT/FR2010/050743
§ 371 (c)(1),
(2), (4) Date: Nov. 25, 2011

(87) PCT Pub. No.: WO2010/136686
PCT Pub. Date: Dec. 2, 2010

(65) Prior Publication Data
US 2012/0070290 A1 Mar. 22, 2012

(30) Foreign Application Priority Data
May 29, 2009 (FR) .................................. 09 53591

(51) Int. Cl.
*B64C 11/32* (2006.01)
*F04D 29/36* (2006.01)
(Continued)

(52) U.S. Cl.
CPC ................. *B64C 11/32* (2013.01); *B64C 11/48* (2013.01); *F01D 7/00* (2013.01); *F02K 1/66* (2013.01);
(Continued)

(58) Field of Classification Search
CPC ........ B64C 11/06; B64C 11/30; B64C 11/32; B64C 11/306; F04D 29/36; F04D 29/058; F04D 29/059; F02C 7/06; F02C 9/58; F05D 2260/79; F05D 2260/72; F05D 2270/60; F05D 2270/61; F05D 2270/62; F05D 2270/64; F05D 2270/65; F05D 2270/66; F03D 7/0224; F01D 7/00; F01D 17/162
USPC ......... 416/147, 149, 150, 155, 159, 163, 164, 416/168 A, 168 R; 415/129, 130
See application file for complete search history.

(56) References Cited

U.S. PATENT DOCUMENTS 3,869,221 A * 3/1975 Wildner ........................ 415/130
3,873,236 A * 3/1975 Gall ............................. 416/162
(Continued)

FOREIGN PATENT DOCUMENTS

GB 2 155 110 9/1985
GB 2 182 727 5/1987

OTHER PUBLICATIONS

U.S. Appl. No. 13/375,041, filed Nov. 29, 2011, Balk, et al.
U.S. Appl. No. 13/544,127, filed Jul. 9, 2012, Gallet.
International Search Report Issued Nov. 24, 2010 in PCT/FR10/050743 Filed Apr. 19, 2010.

*Primary Examiner* — Dwayne J White
*Assistant Examiner* — Joshua R Beebe
(74) *Attorney, Agent, or Firm* — Oblon, McCelland, Maier & Neustadt, L.L.P.

(57) ABSTRACT

A device for controlling pitch of fan blades of a turboprop including at least one set of adjustable-pitch fan blades secured to rotate with a rotary ring mechanically connected to a turbine rotor, each blade of the set being coupled for pitch adjustment to a synchronization ring. The device includes a rolling bearing including an inner cage slidably mounted on a turbine casing and connected to the rod of an actuator, and an outer cage that is mechanically connected to the synchronization ring by a plurality of connection arms connected to the actuator rod and hinge-mounted on the synchronization ring such that actuating the actuator causes the synchronization ring to move in turning about the longitudinal axis.

10 Claims, 3 Drawing Sheets

(51) Int. Cl.
  *B64C 11/48* (2006.01)
  *F01D 7/00* (2006.01)
  *F02K 1/66* (2006.01)
  *F02K 3/02* (2006.01)
  *B64C 11/30* (2006.01)
  *B64D 27/02* (2006.01)
  *B64D 27/00* (2006.01)

(52) U.S. Cl.
  CPC ............... *F02K 3/02* (2013.01); *B64C 11/308* (2013.01); *B64D 2027/026* (2013.01); *Y02T 50/671* (2013.01); *Y02T 50/673* (2013.01); *B64D 2027/005* (2013.01)

USPC ..................... 416/168 R; 415/129

(56) References Cited

U.S. PATENT DOCUMENTS

| | | | | |
|---|---|---|---|---|
| 3,922,852 | A | * | 12/1975 | Drabek ................. 60/226.1 |
| 4,657,484 | A | * | 4/1987 | Wakeman et al. ........... 416/127 |
| 4,762,466 | A | * | 8/1988 | Bouiller et al. ............ 416/205 |
| 4,810,164 | A | * | 3/1989 | Wright ................... 415/129 |
| 4,913,623 | A | * | 4/1990 | Schilling et al. ............ 416/51 |
| 6,071,076 | A | * | 6/2000 | Ansari et al. ............. 416/168 R |
| 2010/0104438 | A1 | | 4/2010 | Charier et al. |
| 2011/0305575 | A1 | | 12/2011 | Balk et al. |

* cited by examiner

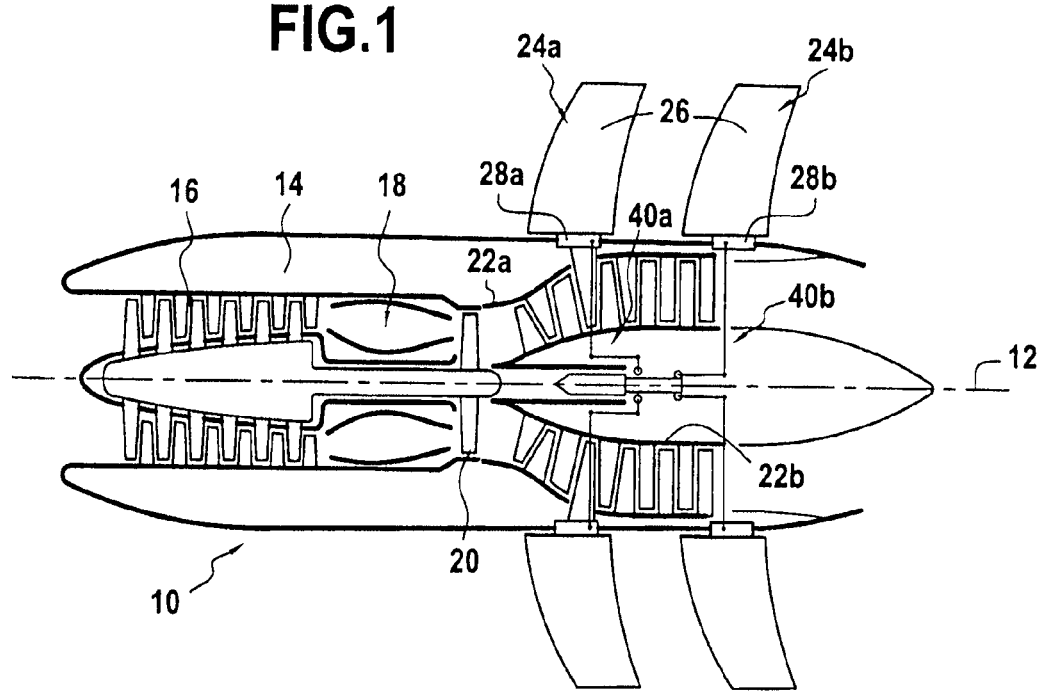
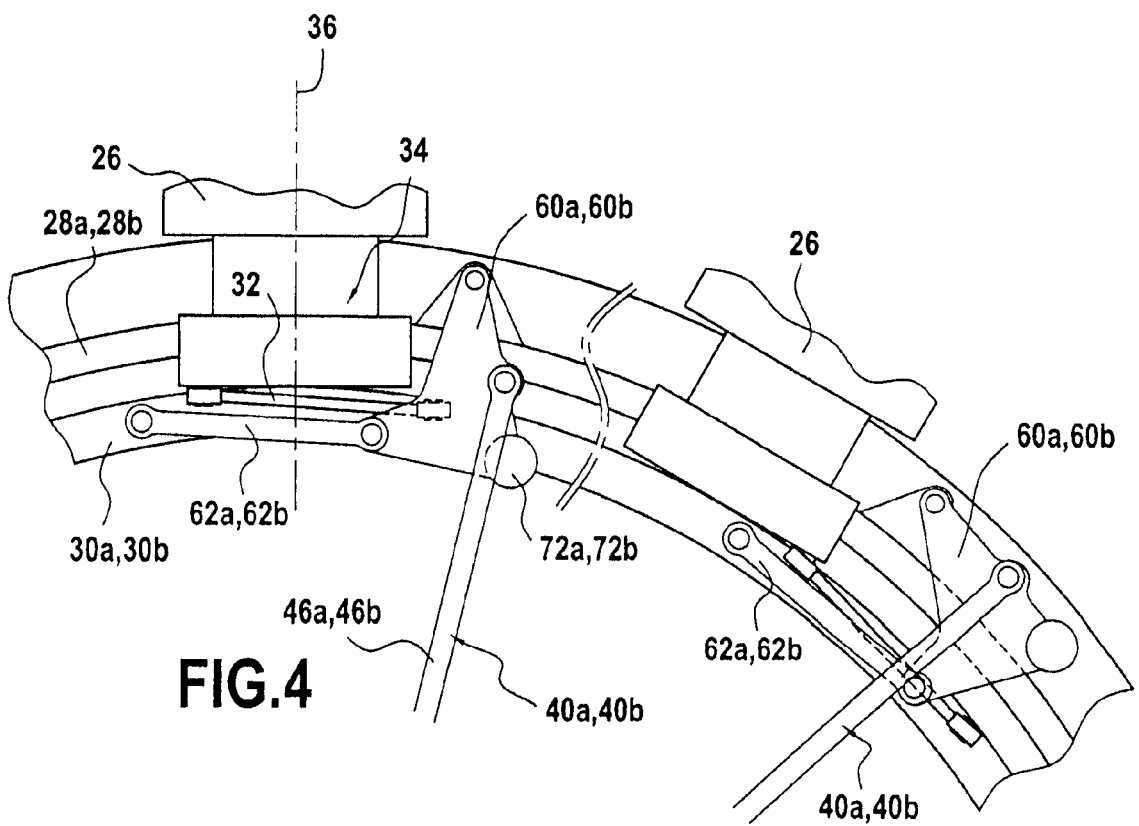

DEVICE FOR CONTROLLING THE PITCH OF FAN BLADES OF A TURBOPROP

BACKGROUND OF THE INVENTION

The present invention relates to the general field of turboprops including at least one set of adjustable-pitch fan blades. More particularly, the invention relates to controlling the pitch of the fan blades of a two-propeller airplane turboprop.

In known manner, a two-propeller airplane turboprop comprises a turbine having two contrarotating rotors, each driving a set of unducted fan blades. By way of example, reference may be made to document GB 2 129 502 that describes various embodiments of such a turboprop.

In a turboprop of this type, the pitch of the fan blades in each set (where pitch may also be referred to as orientation) constitutes one of the parameters enabling the thrust of the turboprop to be controlled. For this purpose, a known solution for controlling the pitch of the fan blades in a given set consists in using a pitch control takeoff via radial shafts that are actuated by actuators situated at the center of the turboprop.

Although effective, that solution nevertheless presents the drawback of being particularly complex to make since it requires the use of a large amount of gearing. Furthermore, that type of control requires radial shafts of large diameter in order to overcome the torsion problems to which they are subjected. Unfortunately, such shafts give rise to a large maximum cross-section, thereby giving rise to additional obstruction in the stream of air flowing through the turbine, and thereby giving rise to a loss of efficiency.

OBJECT AND SUMMARY OF THE INVENTION

A main object of the present invention is thus to mitigate such drawbacks by proposing fan blade pitch control that does not require having recourse to shafts that work in torsion.

This object is achieved by a device for controlling the pitch of the fan blades of a turboprop having at least one set of adjustable-pitch fan blades, said set being secured to rotate with a rotary ring centered on a longitudinal axis and mechanically connected to a turbine rotor, each blade of the set being coupled for pitch adjustment to a synchronization ring centered on the longitudinal axis, the device being characterized in that it further comprises a rolling bearing having an inner cage slidably mounted on a turbine casing and connected to the rod of an actuator centered on the longitudinal axis, and an outer cage that is mechanically connected to the synchronization ring by means of a plurality of connection arms connected to the actuator rod and hinge-mounted on the synchronization ring in such a manner that actuating the actuator causes the synchronization ring to move in turning about the longitudinal axis.

The control device of the invention presents the advantage that the connection arms work in traction as opposed to in torsion, such that the links constituting them can be of small diameter. Furthermore, the control device does not have any gearing. This leads to control that is reliable, accurate, and of low weight.

Furthermore, the actuator of the control device of the invention is stationary in rotation, with all of the advantages that that presents in terms of reliability. The actuator rod is connected to a cage of a rolling bearing that is mounted on a turbine casing.

In an advantageous provision, each connection arm comprises an axial link connected to the outer cage of the rolling bearing, a radial link connected to the synchronization ring, and at least one bellcrank connecting the axial link to the radial link in such a manner that actuating the actuator causes the radial link to move in a direction that is substantially radial.

Preferably, each connection arm further includes another bellcrank secured to the rotary ring and connected firstly to the radial link and secondly to a tangential link fastened to the synchronization ring in such a manner that movement of the radial link in a direction that is substantially radial causes the synchronization ring to move in turning about the longitudinal axis.

Also preferably, the inner cage of the rolling bearing is suitable for sliding longitudinally on the turbine casing by means of fluting.

The radial link of each connection arm may be guided radially by leaktight bearings.

Advantageously, the control device further includes means for imparting a predetermined pitch to the fan blades in the event of the actuator failing.

Also advantageously, each connection arm of the control device passes radially through a casing arm of the turboprop.

The connection arms may be regularly distributed about the longitudinal axis. Finally, the set may comprise ten fan blades and the actuator may be mechanically connected to the synchronization ring by means of five connection arms.

The invention also provides a two-propeller turboprop comprising a turbine having two contrarotating rotors and two sets of adjustable-pitch fan blades constrained to rotate with two rotary rings connected to respective ones of the rotors, the pitch of the fan blades of at least one of the sets being controlled by a device as defined above.

BRIEF DESCRIPTION OF THE DRAWINGS

Other characteristics and advantages of the present invention appear from the description made below with reference to the accompanying drawings that show an embodiment having no limiting character. In the figures:

FIG. 1 is a diagrammatic longitudinal section view of a two-propeller turboprop having a device of the invention for controlling the pitch of the propellers;

FIG. 4 is an end view of a portion of the control device of FIGS. 2 and 3.

DETAILED DESCRIPTION OF AN EMBODIMENT

Figure 2:
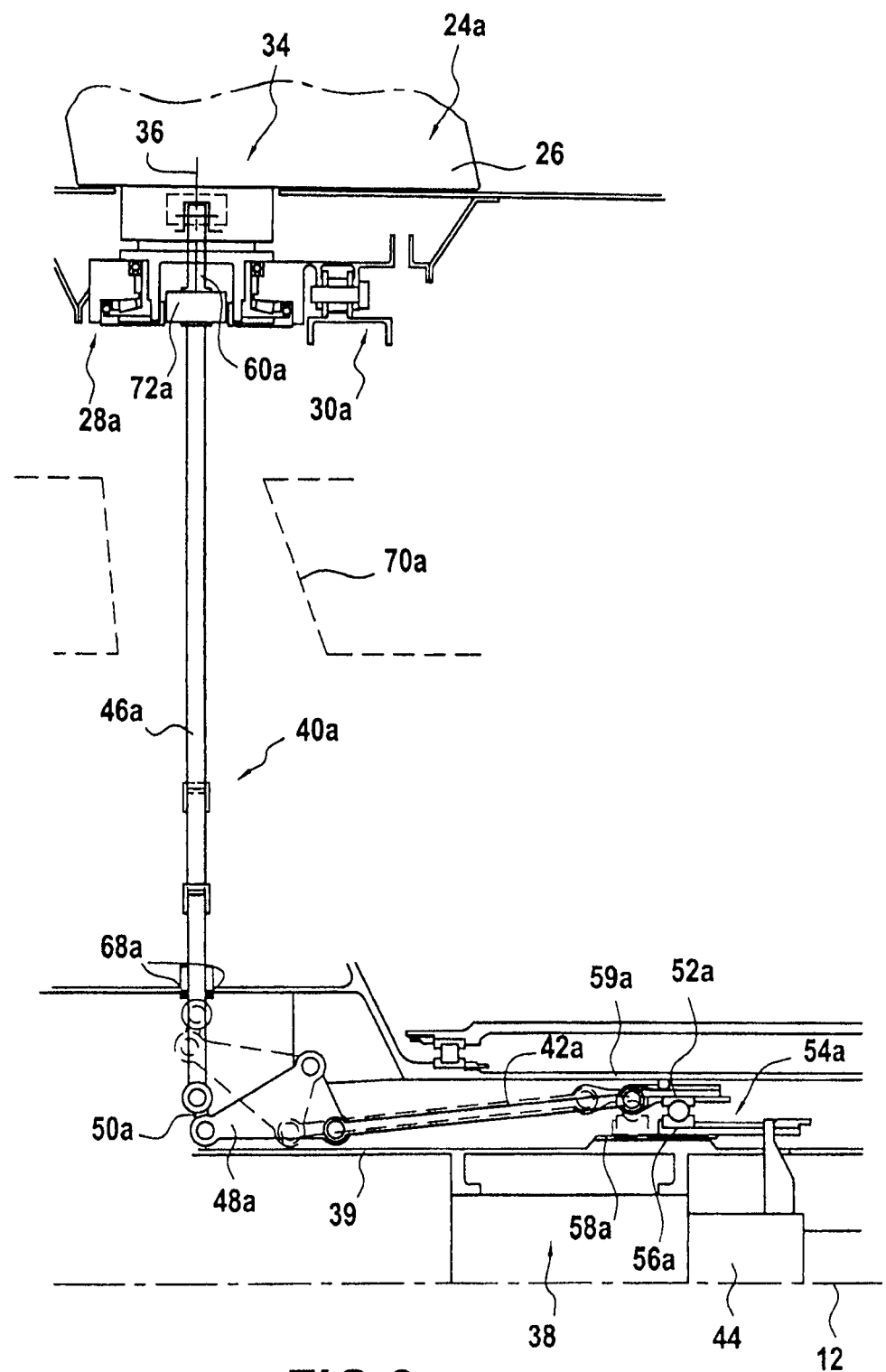
FIG. 2 is an enlarged view of FIG. 1 showing how the propeller pitch of the upstream set is controlled.

FIG. 1 is a highly diagrammatic view of an embodiment of an airplane turboprop of the type having two propellers.

Such a turboprop is known and is therefore not described in detail. The turboprop 10 comprises in particular a longitudinal axis 12 and an annular nacelle 14 arranged coaxially around the longitudinal axis. The turboprop 10 also includes, going from upstream to downstream: a compressor 16, a combustion chamber 18, and a turbine 20 having two contrarotating rotors 22a, 22b, these various elements being likewise disposed coaxially about the longitudinal axis 12 of the turboprop.

The turboprop 10 also includes an upstream (or front) set 24a and a downstream (or rear) set 24b of adjustable-pitch fan blades 26. The fan blades 26 in each set 24a, 24b are mounted more particularly on respective rotary rings 28a, 28b, each forming an annular platform centered on the longitudinal axis 12 of the turboprop.

The fan blades 26 in each set are also regularly spaced apart circumferentially, and they extend radially from the surface of the respective rotary ring 28a, 28b. Each rotor 22a, 22b of the turbine 20 carries and drives in rotation one of the rotary rings 28a, 28b on which one of the sets 24a, 24b of adjustable-pitch fan blades is mounted.

The turboprop also includes a device for controlling the pitch of the fan blades in each set 24a, 24b. The control device of the invention serves to adjust the pitch of the fan blades both in the upstream set 24a and in the downstream set 24b. Nevertheless, it could be used for controlling the pitch of the blades in only one of these sets.

Figure 3:
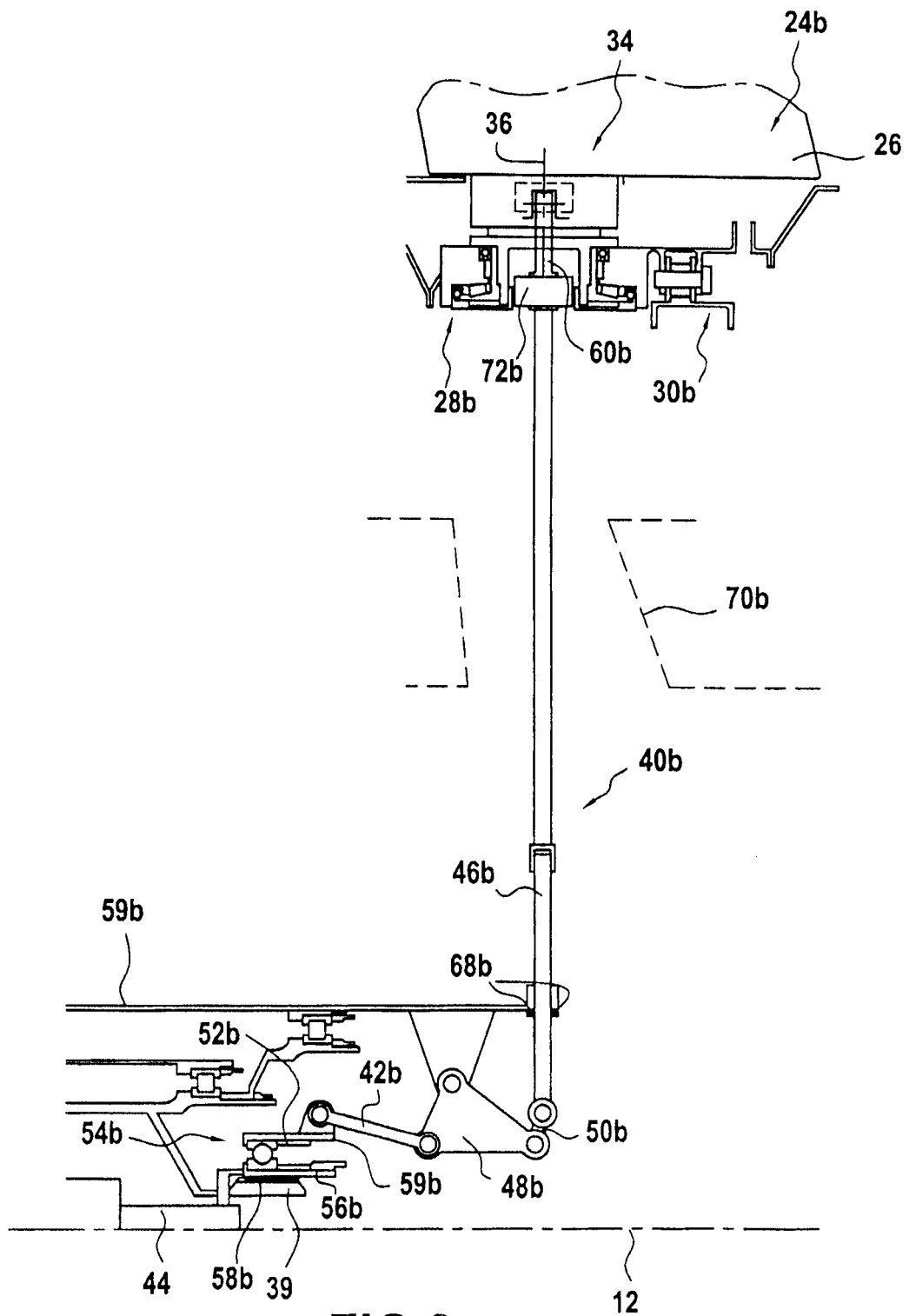
FIG. 3 is an enlarged view of FIG. 1 showing how the propeller pitch of the downstream set is controlled.

As shown more precisely in FIGS. 2 and 3, the control device of the invention includes, for each set 24a, 24b, a synchronization ring 30a, 30b that is centered on the longitudinal axis 12 of the turboprop and that is arranged coaxially relative to the corresponding rotary ring 28a, 28b, which synchronization rings are commonly polygonal in shape.

Furthermore, as shown in FIG. 4, each synchronization ring 30a, 30b is connected to blade-root supports 34 that are pivotally mounted in the corresponding rotary ring 28a, 28b, the connections being via respective drive links 32 having hinges at both ends. In known manner, each support 34 receives the root of a blade 26, e.g. by means of a dovetail-shaped attachment, and is fastened to the rotary ring so as to be capable of pivoting about a radial axis 36, e.g. by means of a ball bearing.

As a result, turning of each synchronization ring 30a, 30b about the longitudinal axis 12 of the turboprop (in one direction or the other) gives rise to swiveling of each blade-root support 34 about its respective radial axis 36 (via the drive links 32), thereby having the effect of changing the pitch of the blades 26 mounted on the supports.

The control device of the invention also includes an actuator 38 (of hydraulic, pneumatic, or electric type) that is centered on the longitudinal axis 12 and that is fastened to a turbine casing 39. The actuator is thus stationary.

The actuator 38 is also mechanically linked to the synchronization rings 30a, 30b by means of a plurality of connection arms 40a, 40b for causing the synchronization rings to turn about the longitudinal axis 12.

With reference to FIGS. 2 and 4, there follows a description of the connection arm 40a connecting the actuator 38 to the synchronization ring 30a of the upstream set 24a.

Each connection arm 40a comprises an axial link 42a that is connected to the rod 44 of the actuator 38, a radial link 46a that is connected to the synchronization ring 30a, and a bellcrank 48a that connects the axial link to the radial link. Each connection arm also includes a coupling link 50a that is interposed between the bellcrank 48a and the radial link 46a.

More precisely, the axial link 42a in each connection arm 40a is connected to the outer cage 52a of a ball bearing 54a. The inner cage 56a thereof is mounted on the turbine casing 39 by fluting 58a and is connected to the rod 44 of the actuator 38. The ball bearing 54a supports a shaft 59a of the rotor 22a in rotation, which rotor drives the rotation of the upstream set 24a and thus enables movement in translation of the actuator rod 44 in a stationary frame of reference (the turbine casing 39) to be transmitted to a rotary frame of reference (the rotor 22a). Furthermore, the bellcrank 48a of each connection arm 40a is pivotally connected to the shaft 59a.

With such an arrangement, it can readily be understood that actuating the actuator 38 causes the ball bearing 54a to move longitudinally by sliding its inner cage 56a over the turbine casing 39. Since the axial link 42a of each connection arm is connected to the outer cage of the ball bearing, it will likewise move along the longitudinal axis 12, thereby causing the bellcrank 48a to rock about its fastening point on the shaft 59a of the rotor 22a. By means of the coupling link 50a, the rocking of the bellcrank 48a about its fastening point causes the radial link 46a to move in a direction that is substantially radial. This linkage is also shown in FIG. 2 where the two extreme positions of the various elements of the connection arm 40a are shown in continuous lines and in dashed lines.

The control device of the invention also includes means for converting this movement of the radial link 46a in each connection arm 40a into turning of the synchronization ring 30a about the longitudinal axis 12.

To this end, and as shown in FIG. 4, each connection arm 40a also has another bellcrank 60a that is pivotally fastened on the rotary ring 28a and that is connected firstly to the radial link 46a and secondly to a tangential link 62a that is also fastened to the synchronization ring 30a. As a result, movement of the radial link in a substantially radial direction causes the bellcrank 60a to rock about its fastening point on the rotary ring, thereby having the effect of moving the tangential link in a direction that is substantially tangential. As a result of this movement, the synchronization ring 30a is caused to turn (in one direction or the other) about the longitudinal axis. This linkage is shown in FIG. 4 where the two extreme positions of various elements performing this conversion are shown side by side.

With reference to FIGS. 3 and 4, there follows a description of the connection arms 40b connecting the actuator 38 to the synchronization ring 30b of the downstream set 24b.

As for the pitch control of the blades of the upstream set, each connection arm 40b comprises an axial link 42b, a radial link 46b that is connected to the synchronization ring 30b, a bellcrank 48b that connects the axial link to the radial link, and a coupling link 50b.

The axial link 42b of each connection arm is connected more particularly to the outer cage 52b of a ball bearing 54b. The inner cage 56b thereof is mounted on the downstream end of the turbine casing 39 via fluting 58b. It is also connected to the rod 44 of the actuator 38.

The ball bearing 54b supports a shaft 59b of the rotor 22b in rotation, which rotor drives rotation of the downstream set 24b, thus making it possible to transmit a movement in translation of the actuator rod 44 in a stationary frame of reference (the turbine casing 39) to a rotary frame of reference (the rotor 22b). Furthermore, the bellcrank 48b of each connection arm 40b is pivotally connected to the shaft 59b.

It can be understood that actuating the actuator thus causes the axial link 42b to move longitudinally, thereby causing the bellcrank 48b to rock about its fastening point on the shaft 59b. The rocking of the bellcrank 48b thus causes the radial link 46b to move in a direction that is substantially radial.

Finally, the movement of the radial links 46b of the connection arms 40b is converted into turning of the synchronization ring 30b about the longitudinal axis 12 in a manner similar to that described with reference to FIG. 4. As shown in this figure, each connection arm 40b includes for this purpose another bellcrank 60b that is pivotally fastened to the rotary ring 28b and that is connected firstly to the radial link 46b and secondly to a tangential link 62b, which tangential link is fastened to the synchronization ring 30b. The linkage is thus identical to that described above for actuating the upstream set.

There follows a description of the characteristics that are common to controlling the pitch of the blades in the upstream set and in the downstream set.

The connection arms 40*a*, 40*b* pass through oil enclosures so the radial links 46*a*, 46*b* of these arms are guided radially at their inner ends by leakproof bearings 68*a* and 68*b*. In addition, the same radial links 46*a*, 46*b* pass radially through a respective casing arm 70*a*, 70*b* of the turboprop.

Furthermore, according to a particularly advantageous characteristic of the invention that is common to controlling the pitch of the blades of the upstream set and of the downstream set, the control device also includes means for imparting a predetermined pitch to the blades in the event of the actuator failing.

As shown in FIG. 4, these means are implemented by flyweights 72*a*, 72*b* that form counterweights. These flyweights 72*a*, 72*b* are secured to the bellcrank 60*a*, 60*b* and are of weight that is determined so as to ensure a traction force on the radial links 46*a*, 46*b*.

Thus, in the event of the actuator 38 failing, the centrifugal force induced by the weight of the radial links 46*a*, 46*b* and of these flyweights 72*a*, 72*b* tends to cause the bellcrank 60*a*, 60*b* to pivot about its fastening point so as to "return" the synchronization ring 30*a*, 30*b* into a predetermined position. For example, this predetermined position may correspond to feathering the fan blades 26.

Furthermore, the figures show a turboprop configuration in which the set of blades having the control device of the invention positioned thereon, itself has ten fan blades 26. In such a configuration, five connection arms 40*a*, 40*b* that are regularly distributed about the longitudinal axis 12 of the turboprop may serve to cause the synchronization rings 30*a*, 30*b* to turn (each of them then being in the form of a decagon).

Finally, the invention is described above with reference to a turboprop having a contrarotating turbine that is directly connected to the propellers. Naturally, the invention also applies to a two-propeller turboprop in which the propellers are driven via planetary gearing.

The invention claimed is:

1. A device for controlling pitch of fan blades of a turboprop including at least one set of adjustable-pitch fan blades, the set being secured to rotate with a rotary ring centered on a longitudinal axis and mechanically connected to a turbine rotor, each blade of the set being coupled for pitch adjustment to a synchronization ring centered on the longitudinal axis, the device comprising:

a rolling bearing including an inner cage slidably mounted on a turbine casing and connected to the rod of an actuator centered on the longitudinal axis; and an outer cage that is mechanically connected to the synchronization ring by a plurality of connection arms connected to the actuator rod and hinge-mounted on the synchronization ring such that actuating the actuator causes the synchronization ring to move in turning about the longitudinal axis.

2. A device according to claim 1, wherein each connection arm comprises an axial link connected to the outer cage of the rolling bearing, a radial link connected to the synchronization ring, and at least one bellcrank connecting the axial link to the radial link such that actuating the actuator causes the radial link to move in a direction that is substantially radial.

3. A device according to claim 2, wherein each connection arm further includes another bellcrank secured to the rotary ring and connected firstly to the radial link and secondly to a tangential link fastened to the synchronization ring such that movement of the radial link in a direction that is substantially radial causes the synchronization ring to move in turning about the longitudinal axis.

4. A device according to claim 2, wherein the inner cage of the rolling bearing is configured to slide longitudinally on the turbine casing by fluting.

5. A device according to claim 2, wherein the radial link of each connection arm is guided radially by leaktight bearings.

6. A device according to claim 1, further comprising means for imparting a predetermined pitch to the fan blades in an event of the actuator failing.

7. A device according to claim 1, wherein each connection arm passes radially through a casing arm of the turboprop.

8. A device according to claim 1, wherein the connection arms are regularly distributed about the longitudinal axis.

9. A device according to claim 1, wherein the set includes ten fan blades and the actuator is mechanically connected to the synchronization ring by five connection arms.

10. A two-propeller turboprop comprising:

a turbine including two contrarotating rotors and two sets of adjustable-pitch fan blades constrained to rotate with two rotary rings connected to respective ones of the rotors, the pitch of the fan blades of at least one of the sets being controlled by a device according to claim 1.

* * * * *